US012770312B1

(12) United States Patent
Pechev

(10) Patent No.: US 12,770,312 B1
(45) Date of Patent: Oct. 20, 2026

(54) AUTOMATIC RETARGETING FOR MATCHING AVATARS

(71) Applicant: Apple Inc., Cupertino, CA (US)

(72) Inventor: Alexandre Pechev, Farnham (BG)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 18/465,799

(22) Filed: Sep. 12, 2023

Related U.S. Application Data

(60) Provisional application No. 63/376,951, filed on Sep. 23, 2022.

(51) Int. Cl.
*G06T 13/00* (2011.01)
*G06T 7/73* (2017.01)

(52) U.S. Cl.
CPC ................ *G06T 13/00* (2013.01); *G06T 7/73* (2017.01); *G06T 2207/30196* (2013.01)

(58) Field of Classification Search
CPC .. G06T 13/00; G06T 7/73; G06T 2207/30196
See application file for complete search history.

(56) References Cited

U.S. PATENT DOCUMENTS

| | | | | |
|---|---|---|---|---|
| 6,057,859 A * | 5/2000 | Handelman | G06T 13/40 | 345/475 |
| 2008/0024503 A1* | 1/2008 | Smith | G06T 13/40 | 345/473 |
| 2010/0302253 A1* | 12/2010 | Kipman | G06T 13/40 | 345/473 |
| 2019/0066351 A1* | 2/2019 | Noh | G06T 19/20 | |

* cited by examiner

*Primary Examiner* — Devona E Faulk
*Assistant Examiner* — Donna J. Ricks
(74) *Attorney, Agent, or Firm* — Blank Rome LLP

(57) ABSTRACT

Transferring an animation from a source avatar to a target avatar includes identifying a first set of segments comprising a first skeleton from an animation for a source avatar, obtaining a second set of segments comprising an intermediate skeleton, determining positional information for each of the first set of segments, modifying the intermediate skeleton based on the positional information, and applying the intermediate skeleton to a target avatar. The positional information includes rotation information for each segment, which is transferred to corresponding segments of the intermediate skeleton to obtain a posed intermediate skeleton. The intermediate skeleton is fit to the target skeleton to translate the pose of the source avatar to the target avatar.

20 Claims, 7 Drawing Sheets

AUTOMATIC RETARGETING FOR MATCHING AVATARS

BACKGROUND

Computerized characters that represent and are controlled by users are commonly referred to as avatars. Avatars may take a wide variety of forms, including virtual humans, animals, and plant life. Some computer products allow a user to design avatars, or transfer an animation from one avatar to another. Known existing systems tend to be computationally intensive, requiring high-performance general and graphics processors, and generally are not user-friendly.

DETAILED DESCRIPTION

Figure 1:
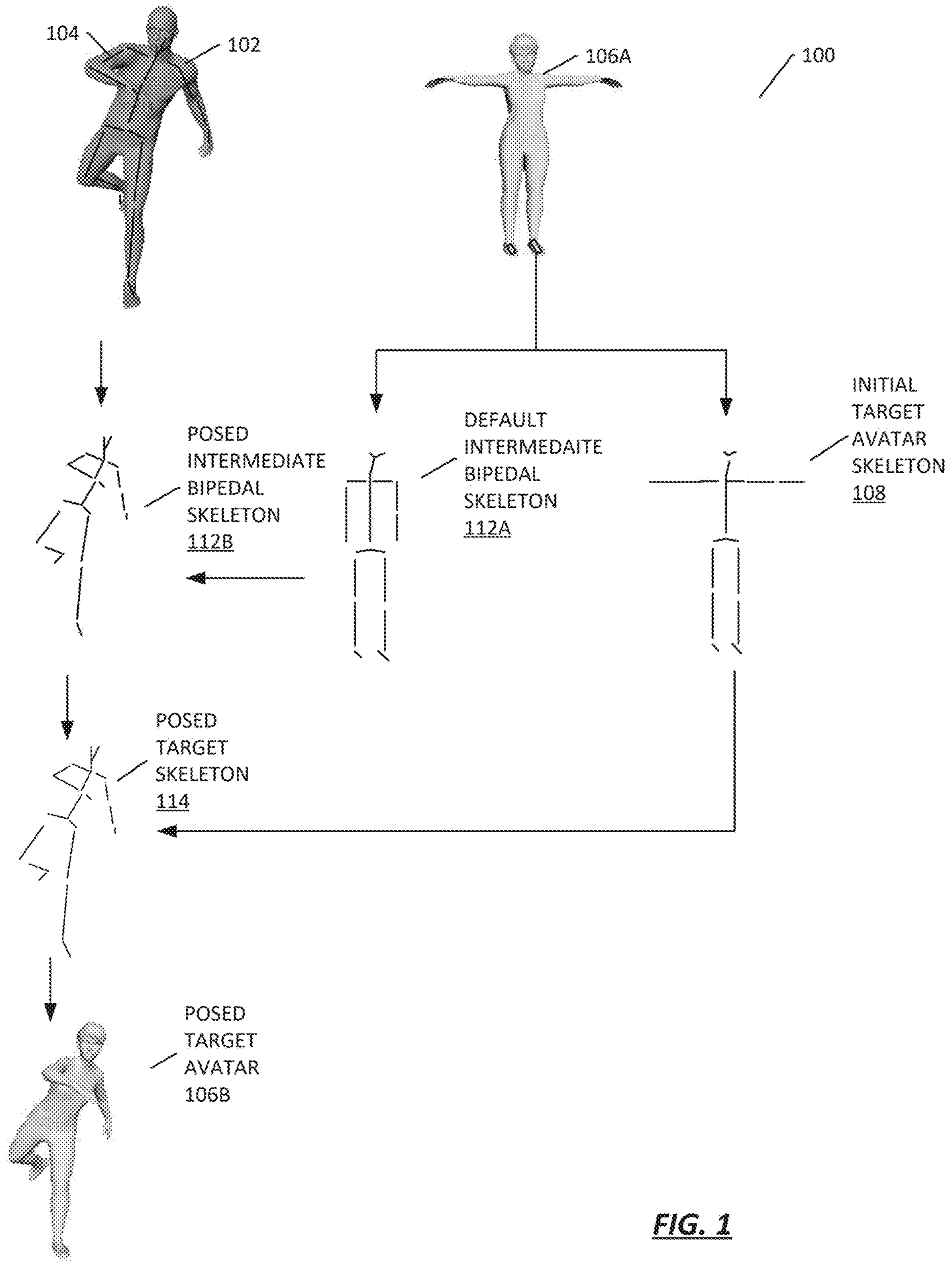
FIG. 1 shows an example flow diagram for utilizing an intermediate skeleton for transferring an animation from a source avatar to a target avatar, according to one or more embodiments.

This disclosure relates generally to image processing. More particularly, but not by way of limitation, this disclosure relates to techniques and systems for transferring an animation from a source avatar to a target avatar.

Techniques described herein refer to the use of an intermediate avatar to transfer a pose from a source avatar to a target avatar. In doing so, a user can transfer an animation from the source avatar to the target avatar without having to pose the avatars in any particular manner. Generally, a source avatar may be associated with an animation. The source avatar is also generally associated with a skeleton comprising a set of segments (sometimes referred to as bones, joints, or the like in a hierarchy indicative of a structural pose of the avatar). The animation may be transferred from a source avatar to a target avatar. For example animation may be transferred when a user wishes to change an avatar representing the user. As another example, a user animating an avatar may wish to change the avatar being animated with particular movement. In response to a request to transfer the pose from the source avatar to the target avatar. An initial intermediate skeleton may be obtained based on a classification of the source and target avatars. The classification may be based on a general structure of the skeleton of the source and target avatars, such as a biped, quadruped, or the like.

In some embodiments, the intermediate skeleton may be generated by identifying, for each segment in the intermediate skeleton, a corresponding segment of the source avatar skeleton. Rotation information is obtained for the source avatar segment. For example, a location of the endpoints of the segment can be obtained, from which a determination of the rotation of the segment can be determined. That rotation from the source avatar segment can then be applied to the intermediate skeleton segment. The same can be completed for each segment in the intermediate skeleton. Then, the intermediate skeleton can be posed by combining the rotated segments. In some embodiments, the rotation for each segment can be applied in an iterative manner starting at a root segment. Once posed, the intermediate skeleton can be applied to the target avatar, for example using an inverse kinematics (IK) solver, to cause the pose of the target avatar to match the pose of the source avatar. As such, the animation from the source avatar can be transferred to the target avatar without having to match the poses of the source avatar and the target avatar. As such, the intermediate skeleton provides the capability to efficiently transfer animation from one avatar to another.

For purposes of this disclosure, the term “avatar” refers to the virtual representation of a real-world subject, such as a person. The real-world subject may have a static shape or may have a shape that changes in response to movement or stimuli.

A physical environment refers to a physical world that people can sense and/or interact with without aid of electronic devices. The physical environment may include physical features such as a physical surface or a physical object. For example, the physical environment may correspond to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person’s physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person’s eyes (similar to contact lenses), headphones/earphones, speaker arrays, input systems (e.g., wearable or handheld controllers with or without haptic feedback, smartphones, tablets, and the like.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints), and these goals may vary from one implementation to another. It will also be appreciated that such development efforts might be complex and time-consuming but would nevertheless be a routine undertaking for those of ordinary skill in the design and implementation of graphics modeling systems, having the benefit of this disclosure.

FIG. 1 depicts a flow diagram of a technique for utilizing an intermediate skeleton for transferring an animation from a source avatar to a target avatar. It should be understood that the particular flow and components of FIG. 1 are presented for example purposes and are not particularly intended to limit the scope of the invention.

FIG. 1 depicts a source avatar 102 in a particular pose. The source avatar may be associated with a skeleton 104, composed of a series of segments positioned in a particular arrangement, which defines a pose of the avatar 102. A target avatar 106A is obtained, and is not necessarily in a same pose as the source avatar 102. In some embodiments, in response to a determination that the source avatar 102 and the target avatar 106A are both bipeds, a bipedal intermediate skeleton 112A may be obtained which includes a predetermined series of segments. The bipedal intermediate skeleton may be a generic skeleton for bipeds, such as a default intermediate bipedal skeleton, and as such may not be specific to a size or bone structure of either the source or target avatars. A determination may be made that the source and target belong to a particular classification for which an intermediate skeleton is available, such as a biped, quadruped, or the like. Each classification may be associated with an initial intermediate skeleton. In some embodiments, the series of segments correspond to segments of a skeleton of the target avatar, or a subset of the segments of a skeleton of the target avatar.

According to some embodiments, rotation information can be determined for at least a subset of the segments of the first skeleton 104 belonging to the source avatar 102. That rotation information (for each segment) can be applied to the segments of the intermediate skeleton 112A to obtain a posed intermediate skeleton 112B.

Figure 2:
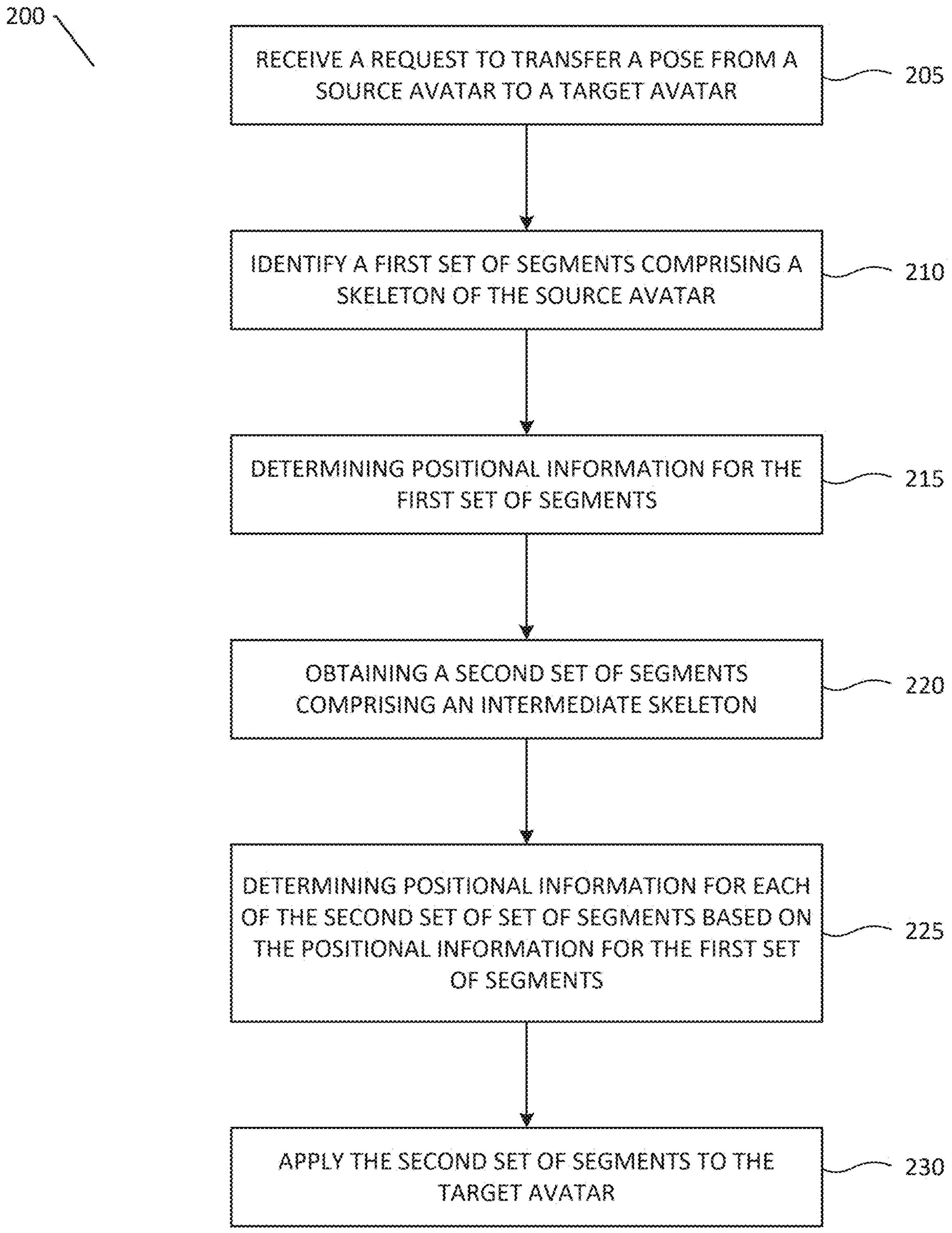
FIG. 2 shows a flowchart of a technique for transferring an animation from a source avatar to a target avatar, according to one or more embodiments.

In some embodiments, the posed intermediate skeleton 112B may be fit to the target avatar 106A by performing a regression function or other fitting technique to obtain a posed target skeleton 114. In some embodiments, an inverse kinematics (IK) solver is applied based on the intermediate skeleton to reconstruct the pose of the source avatar 102 at the target avatar 106B. In some embodiments, the posed intermediate skeleton 112A can be applied to an initial target avatar skeleton 108 of the target avatar to obtain a posed target skeleton 114. The posed target skeleton 114 may be applied to the target avatar 106A to obtain a posed target avatar 106B. FIG. 2 depicts a flowchart 200 of a technique for retargeting a pose from the source avatar to a target avatar, in accordance with one or more embodiments. Although the various process depicted in FIG. 2 are illustrated in a particular order, it should be understood that the various processes described may be performed in a different order. Further, not all of the various processes may be necessary to be performed in order to retarget a pose from a source avatar to a target avatar.

The flowchart begins at block 205, where a request is received to transfer a pose from a source avatar to a target avatar. The request may be received, for example, based on the user request to transfer an animation from a source avatar to a target avatar. In some embodiments, the technique may be provided by an API in a computing system which may receive API calls requesting transfer an animation from a source avatar to a target avatar or, in particular, to match a pose of a target avatar to that of a source avatar such that an animation can be transferred.

The flowchart 200 continues at block 210, where a first set of segments is identified. The first of segments is identified based on the source avatar. For example, the first set of segments may comprise a skeleton of the source avatar. In some embodiments, the source avatar has a known skeleton, including a series of segments which provide an indication of a pose of the source avatar. At block 215, positional information is determined for the first set of segments. According to one or more embodiments, each segment may be associated with a start point and end point. That positional information may be used to infer additional positional information, such as rotation (i.e., a particular pose in 3-D space) and the like.

The flowchart 200 continues at block 220, where a second set of segments is obtained, comprising an intermediate skeleton. The intermediate skeleton may be an intermediate stage hierarchy between a skeleton of the source avatar and a skeleton of the target avatar, and constructed from a set of segments. The intermediate skeleton may have a same or different number of segments as the first set of segments.

At block 225, positional information is determined for each of the second set of segments based on the positional information for the first of segments. As such, the second set of segments are adjusted based on the first set of segments. In some embodiments, the positional information for the second set of segments may be represented in the form of rotation information, which is determined from location information of each of the corresponding segments of the first set of segments, as will be described in greater detail below with respect to FIG. 3. For example, at block 215, the positional information may include a start point and end point for each of the various segments. Rotation information for the segments can be inferred from the location information. As such, applying the rotation to a particular segment of the second set of segments causes the particular segment to align with the specific pose of the corresponding segment of the first set of segments for which position information is obtained. In doing so, a difference in the length or size of the first and second set of segments is irrelevant because the rotation is transferred from the first segments to the second segments without regard for length or size of the segments.

The flowchart concludes at block 230, where the adjusted second set of segments (that is, the segments having rotational information applied) is applied to the target avatar. In some embodiments, the target avatar may be associated with a target skeleton, to which the intermediate skeleton is mapped. Alternatively, a target skeleton may be determined, for example using machine learning methods, to which the second set of segments can be mapped. That is, according to one or more embodiments, a machine learning model can be trained to predict a skeleton based on image data for an avatar. In some embodiments, once the intermediate skeleton is created, the intermediate skeleton can be used in IK solver where every segment in the intermediate skeleton is used as a position demand to pose the target avatar. In some embodiments, the intermediate skeleton corresponds to the target avatar's proportion, and, as such, the constraint demands are with zero offset. As a result, the pose of the target avatar closely resembles the pose of the source avatar.

Figure 3:
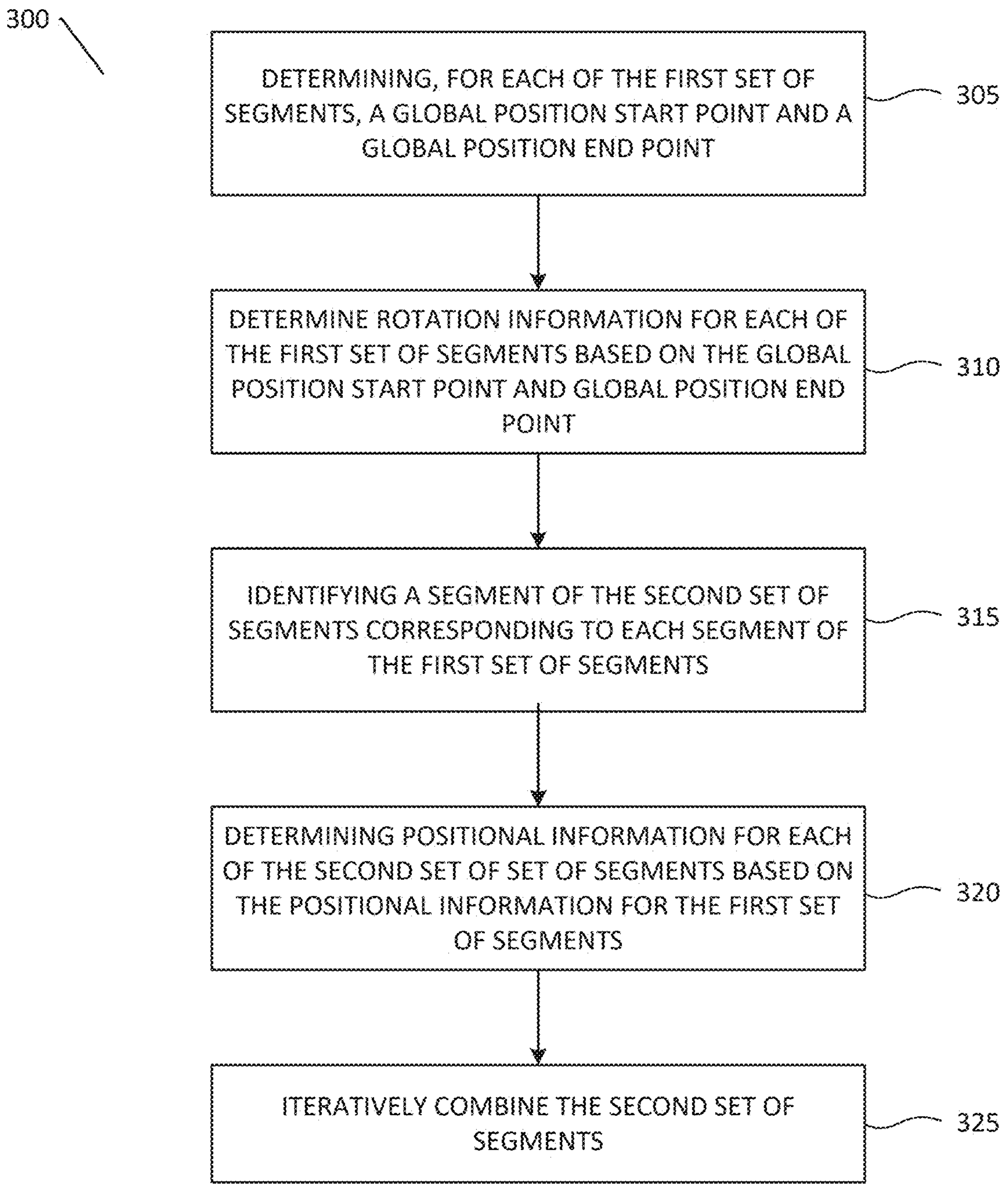
FIG. 3 shows, in flowchart form, a technique for generating an intermediate skeleton, according to one or more embodiments.

FIG. 3 depicts a flowchart of a technique for generating an intermediate skeleton in accordance with one or more embodiments. Although the various process depicted in FIG. 3 are illustrated in a particular order, it should be understood that the various processes described may be performed in a different order. Further, not all of the various processes may be necessary to be performed retarget a pose from a source avatar to a target avatar.

The flowchart 300 begins at block 305, where a global position start point and end point are determined for each of the first set of segments. That is, for each segment of the skeleton of a source avatar, a start point and end point location are determined. The start point and end point may be determined, for example, as 3-D coordinates or the like. In some embodiments, the global positions may be determined with respect to a global coordinate system, a coordinate system of the source avatar, or the like.

The flowchart 300 proceeds to block 310, where rotation information is determined for each of the first set of segments. The rotation information is determined based on the global position start point and end point of each segment. For example, knowing a start point and end point of a segments, a rotation of the segment may be determined based on the geometry of the pose of the segments.

In some embodiments, the rotation for a particular segment may be determined as follows. For a start point m1(x,y,z) and end point m2(x,y,z), a local unit vector r is computed as:

$$r = m2 - m1/|m2 - m1|$$

where |m2-m1| is the norm of m2-m1. Then, current and previous frames are used to compute the normalized direction of point m2 as:

$$vm2 = m2 - m2\_1/|m2 - m2\_1|$$

where m2-1 is the position of m2 at previous frame. The first principal axis of a Rotation Matrix R is constructed as $$Zo = r.$$

The second principal axis of a Rotation Matrix R is computed as:

$$Yo = -\mathrm{cross}(r, vm2)/|\mathrm{cross}(r, vm2)|$$

where cross (r,vm2) is the cross product of r and vm2. The third principal axis of a Rotation Matrix R is computed as:

$$Xo = \mathrm{cross}(Yo, Zo)$$

here cross (Yo,Zo) is the cross product of Yo and Zo as computed above. A rotation matrix R is constructed as:

$$\begin{matrix} |Xo| \\ R = |Yo| \\ |Zo| \end{matrix}$$

which is an estimate of the rotation of a unit vector that points from m1 to m2.

The flowchart 300 continues at block 315 where, for each segment of the second set of segments, a corresponding segment of the first set of segments is identified. In some embodiments, the second set of segments may have fewer segments than the first set of segments. As such, only a subset of the first set of segments may correspond to the segments that comprise the intermediate skeleton. In turn, in some embodiments, the rotation information determined at 310 may only be determined for the segments of the first set of segments at corresponding to segments of the second set of segments.

The correspondences between the first set of segments and the second set of segments may be determined in a number of ways. For example, in some embodiments, the segments of each of the first skeleton and the intermediate skeleton may be associated with labels which may indicate a segment classification. As another example, a determination may be made based on a machine learning algorithm which is trained to predict correspondences between segments of two given skeletons of a given type (such as bipedal skeletons, quadrupedal skeletons, and the like).

The flowchart 300 continues at block 320, where positional information is determined for each of the second set of segments based on the positional information for the first set of segments. In particular, in some embodiments, the rotation information that is determined for each of the first of segments at block 310 can be applied to the corresponding segments of the intermediate skeleton. Notably, in some embodiments, only the rotational information is applied (i.e., an orientation of the segment), and not location information. Rather, the individual segments of the intermediate skeleton may be associated with different lengths or other characteristics then the first skeleton. The result is, in some embodiments, a set of segments associated with segment types, each having an applied rotation. As such, applying the rotation to a particular segment of the intermediate skeleton causes the segment to rotate to align with a pose of a corresponding segment from the first skeleton.

The flowchart 300 concludes at block 325, where the second set of segments are iteratively combined to obtain a posed intermediate skeleton. In some embodiments, a loop is constructed that traverses through all of the segments of the second set of segments beginning at a root segment. For example, the root segment could be a segment located at the hips of the skeleton, the head of the skeleton, or the like. In some embodiments, the root segment may be positioned to align with a corresponding root segment of a skeleton of the target avatar. The next joint in the intermediate skeleton (for example, an adjacent segment to the root segment), may then be selected and positioned at the end point of the root segment in accordance with the rotation computed for the next segment. This process may continue for each of the segments in the intermediate skeleton. In some embodiments, the rotations of each of the segments of the intermediate skeleton can be applied to segments of a skeleton of the target avatar. For example, as described above with respect to FIG. 2, the combined, posed intermediate skeleton can be used in an IK solver where each segment of the intermediate skeleton is used as a position demand to the pose of the target avatar.

Figure 4:
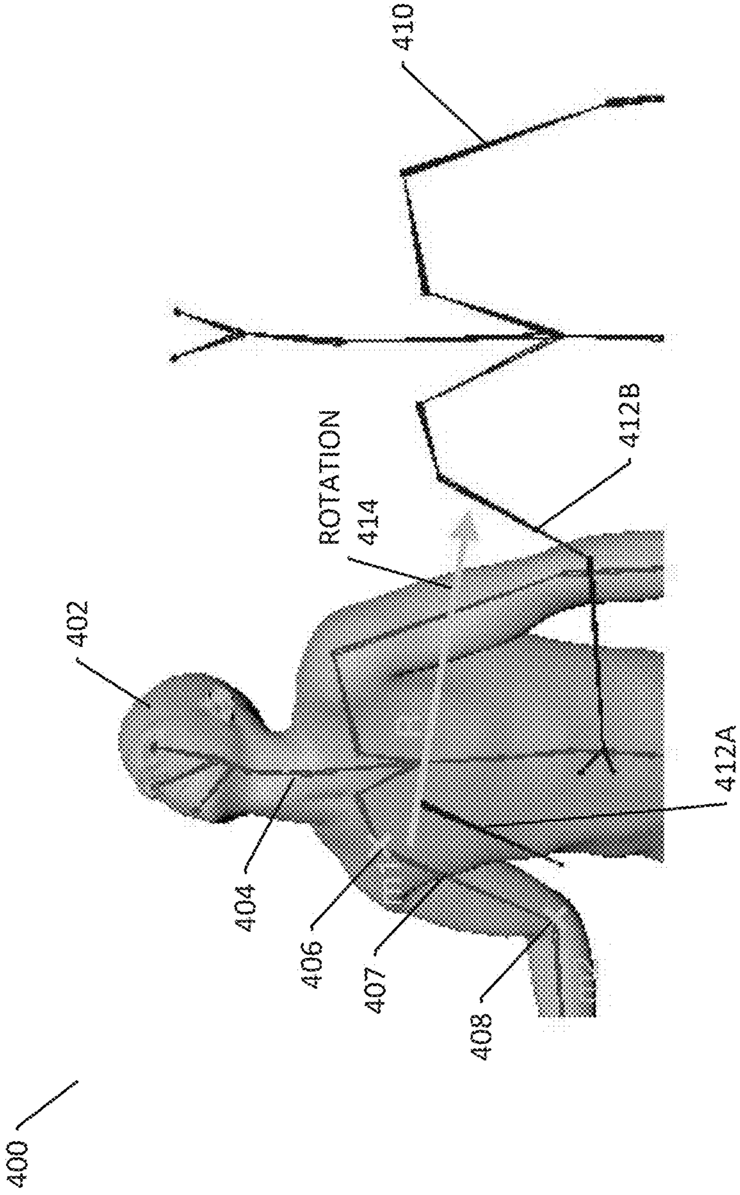
FIG. 4 shows an example diagram of a technique for transferring a rotation of a segment to an intermediate skeleton, according to one or more embodiments.

FIG. 4 depicts an example diagram 400 of a technique for obtaining an intermediate skeleton for 10 from a source avatar 402. In particular, as shown, the source avatar 402 is associated with a source skeleton 404 comprising a set of segments. Among the segments is segment 407, which is associated with an upper arm of the source avatar 402. As described above, positional information can be obtained for the particular segment 407. This includes, for example, a location of a start point 406, and the location of an endpoint 408. From these two points, a rotation of the segment 407 can be determined. That rotation can then be applied to a corresponding segment 412A, thus causing the corresponding segment 412A from an intermediate skeleton to align with the rotation of segment 407. The segment 412A can then be used within part of the intermediate skeleton 410, as shown at segment 412B. Accordingly, as shown, the rotation 414 is transferred from the segment of the source avatar to the intermediate skeleton, and not the location information, length information, or other characteristics.

Figure 5:
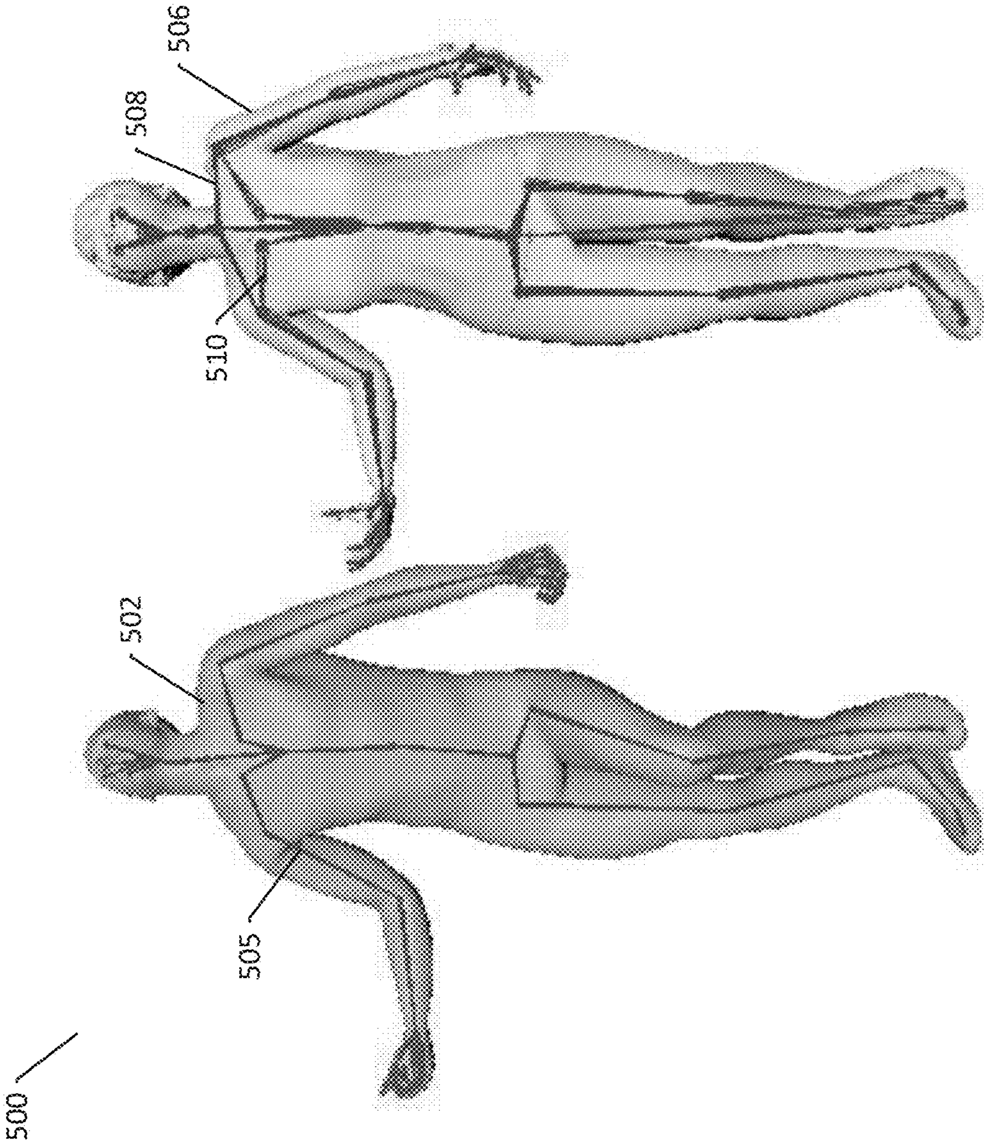
FIG. 5 shows an example diagram of a technique for transferring an intermediate skeleton to a target avatar, according to one or more embodiments.

FIG. 5 depicts an additional example diagram 500 of a technique for applying an intermediate skeleton 508 to generate a target avatar 506 from a source avatar 502. In particular, the source avatar 502 is associated with a source skeleton 505 comprising a set of segments. From the set of segments, and based on the target avatar 506, an intermediate skeleton is obtained. The intermediate skeleton is posed based on rotation information for each of the corresponding segments of the source skeleton 505 to result in a posed intermediate skeleton 508. As described above, in some embodiments, the target avatar 506 may be associated with a target skeleton 510. In some embodiments, the posed intermediate skeleton 508 can be applied to the target skeleton 510 to obtain a posed version of the target avatar 506 corresponding to the posed source avatar 502. For example, an IK solver can be used to fit the posed intermediate skeleton 508 to a target skeleton 510 of the target avatar 506.

Figure 6:
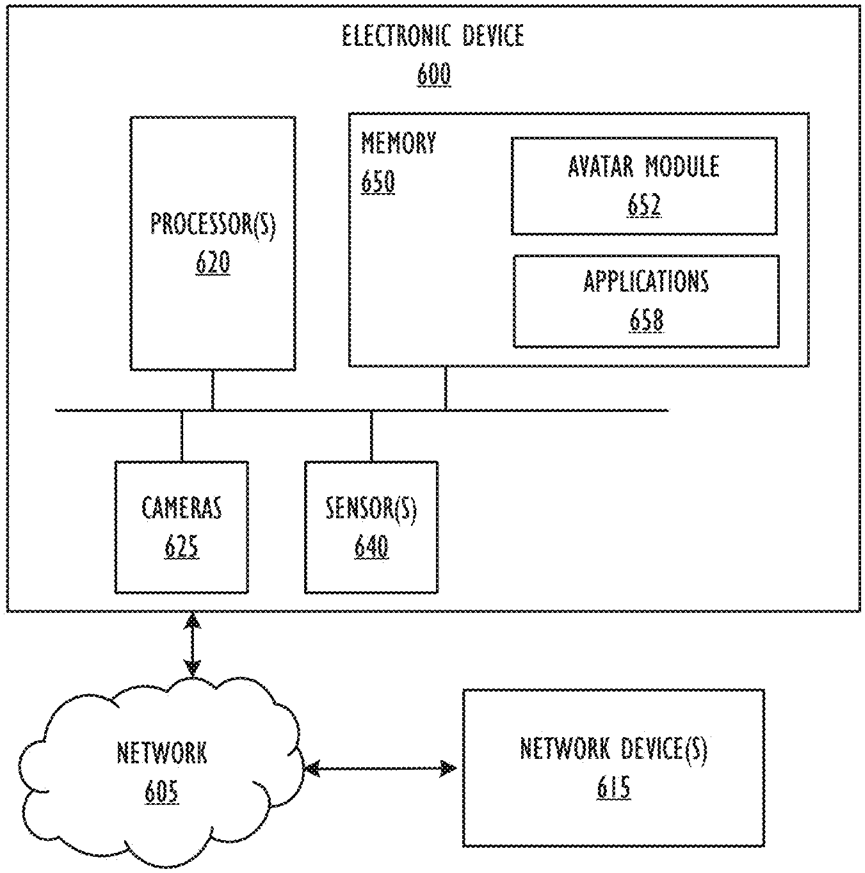
FIG. 6 shows, in block diagram form, a multifunction electronic device, in accordance with one or more embodiments.

Referring to FIG. 6, a simplified block diagram of an electronic device 600 is depicted, communicably connected to one or more network device(s) 615, in accordance with one or more embodiments of the disclosure. Electronic device 600 may be part of a multifunctional device, such as a mobile phone, tablet computer, personal digital assistant, portable music/video player, wearable device, base station, laptop computer, desktop computer, network device, or any other electronic device. Electronic device 600 may be connected to the one or more network device(s) 615 across a network 605. Illustrative networks include, but are not limited to, a local network such as a universal serial bus (USB) network, an organization's local area network, and a wide area network such as the Internet.

Electronic device 600 may include a processor 620, such as a central processing unit (CPU). Processor 620 may be a system-on-chip such as those found in mobile devices and include one or more dedicated graphics processing units (GPUs). Further, processor 620 may include multiple processors of the same or different type. Electronic device 600 may also include a memory 650. Memory 650 may include one or more different types of memory, which may be used for performing device functions in conjunction with processor 620. For example, memory 650 may include cache, ROM, RAM, or any kind of transitory or non-transitory computer-readable storage medium capable of storing computer-readable code. Memory 650 may store various programming modules for execution by processor 620, including avatar module 652. Avatar module 652 may include computer readable code for transferring an animation from a source avatar to a target avatar. In some embodiments, avatar module 652 may include an API which may be called from other animation applications or the like, such as applications 658. Additionally, or alternatively, avatar module 652 may be a standalone application.

Electronic device 600 may also include one or more cameras 625 or other sensors 640, from which characteristics of a scene may be determined. In one or more embodiments, cameras 625 may be a traditional RGB camera or a depth camera. Further, cameras 625 may include a stereo- or other multi-camera system, a time-of-flight camera system, or the like which capture images from which depth information of a scene may be determined. In some embodiments, the cameras 625 and/or sensor(s) 640 may be used to capture movement of a subject which may be used for determining an animation of a source and/or target avatar.

Figure 7:
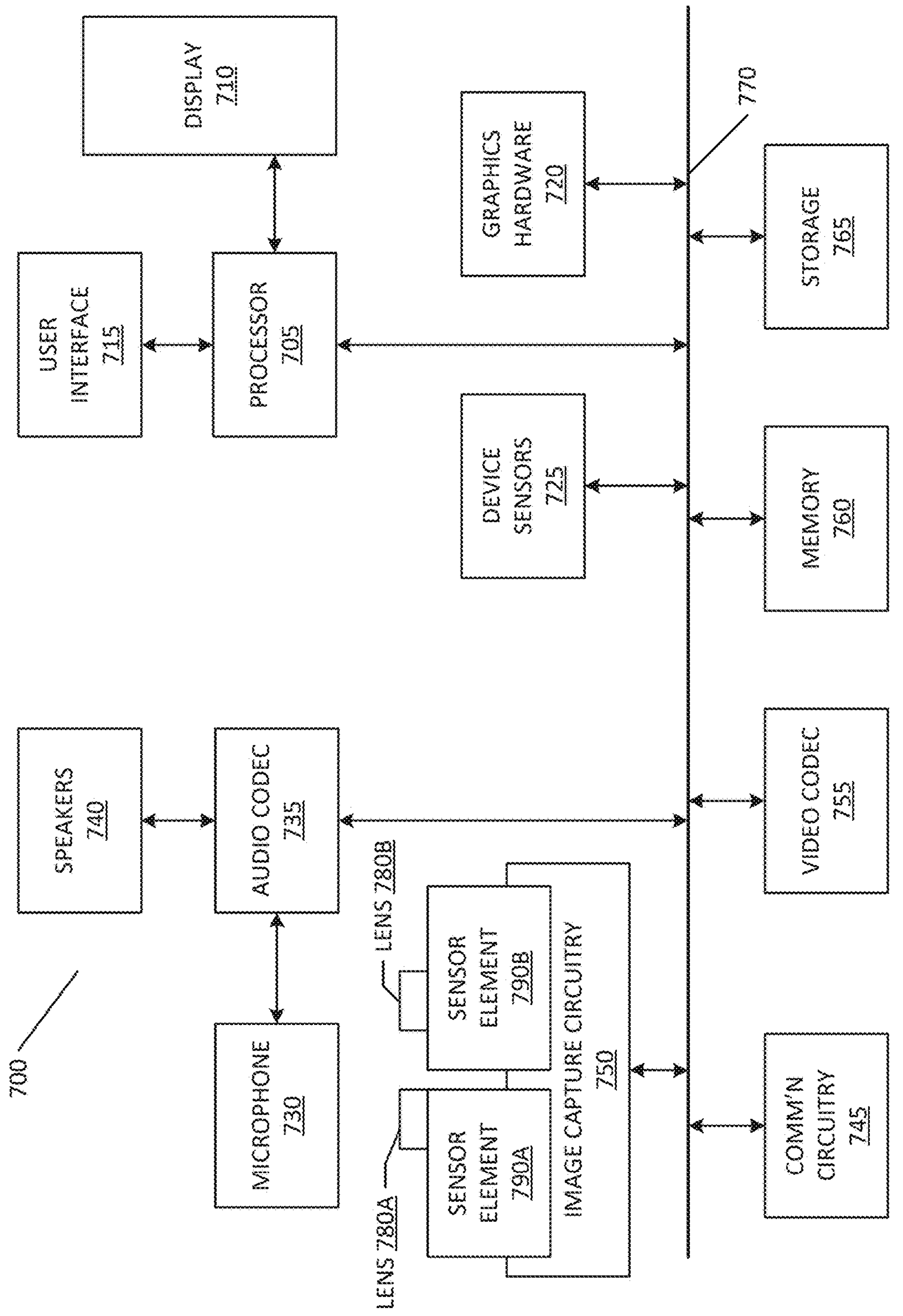
FIG. 7 shows, in block diagram form, a computer system, in accordance with one or more embodiments.

Referring now to FIG. 7, a simplified functional block diagram of illustrative multifunction electronic device 700 is shown, according to one embodiment. Each of electronic devices may be a multifunctional electronic device or may have some or all of the described components of a multifunctional electronic device described herein. Multifunction electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system), video codec(s) 755 (e.g., in support of digital image capture unit), memory 760, storage device 765, and communications bus 770. Multifunction electronic device 700 may be, for example, a digital camera or a personal electronic device such as a personal digital assistant (PDA), personal music player, mobile telephone, or a tablet computer.

Processor 705 may execute instructions necessary to carry out or control the operation of many functions performed by device 700 (e.g., such as the generation and/or processing of images as disclosed herein). Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include two (or more) lens assemblies 780A and 780B, where each lens assembly may have a separate focal length. For example, lens assembly 780A may have a short focal length relative to the focal length of lens assembly 780B. Each lens assembly may have a separate associated sensor element 790. Alternatively, two or more lens assemblies may share a common sensor element. Image capture circuitry 750 may capture still and/or video images. Output from image capture circuitry 750 may be processed, at least in part, by video codec(s) 755 and/or processor 705 and/or graphics hardware 720, and/or a dedicated image processing unit or pipeline incorporated within image capture circuitry 750. Images so captured may be stored in memory 760 and/or storage 765.

Image capture circuitry 750 may capture still and video images that may be processed in accordance with this disclosure, at least in part, by video codec(s) 755 and/or processor 705 and/or graphics hardware 720, and/or a dedicated image processing unit incorporated within image capture circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory computer-readable storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705, such computer program code may implement one or more of the methods described herein.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions or the arrangement of elements shown should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A method comprising:

identifying, by one or more processors, a first set of segments representing a first skeleton from a source avatar in a first pose;

obtaining, by the one or more processors, a second set of segments representing an intermediate skeleton in a second pose;

determining, by the one or more processors, positional information for each of the first set of segments;

modifying, by the one or more processors, the intermediate skeleton based on the positional information of the first set of segments to generate a modified intermediate skeleton comprising modified positional information for one or more of the second set of segments;

applying, by the one or more processors, the modified intermediate skeleton to a target avatar skeleton in a third pose to cause the target avatar skeleton to transition from the third pose to the first pose, wherein the third pose is different than the second pose, wherein the target avatar skeleton is associated with a target avatar; and placing the target avatar in the third pose using the target avatar skeleton.

2. The method of claim 1, wherein identifying the first set of segments comprises:

identifying a complete set of segments for the source avatar; and selecting a subset of the complete set of segments corresponding to the second set of segments associated with the intermediate skeleton.

3. The method of claim 1, wherein determining positional information comprises, for each segment of the first set of segments:

determining a global position start point; and determining a global position end point.

4. The method of claim 3, further comprising:

determining rotational information from the global position start point and the global position end point.

5. The method of claim 4, wherein modifying the intermediate skeleton based on the positional information comprises applying the rotation information for a particular segment to a corresponding segment in the intermediate skeleton.

6. The method of claim 5, wherein modifying the intermediate skeleton based on the positional information comprises:

iteratively applying the rotation information for every segment in the first set of segments to the second set of segments.

7. The method of claim 1, wherein applying the modified intermediate skeleton to the target avatar skeleton comprises applying an inverse kinematics solver to the intermediate skeleton and the target avatar skeleton to obtain a target avatar pose.

8. The method of claim 1, wherein applying the modified intermediate skeleton to the target avatar skeleton causes a transfer of an animation from the source avatar to the target avatar.

9. The method of claim 1, wherein the intermediate skeleton is obtained based on the source avatar.

10. A non-transitory computer readable storage medium comprising computer readable code executable by one or more processors to:

identify a first set of segments representing a first skeleton from a source avatar in a first pose;

obtain a second set of segments representing an intermediate skeleton in a second pose;

determine positional information for each of the first set of segments;

modify the intermediate skeleton based on the positional information of the first set of segments to generate a modified intermediate skeleton comprising modified positional information for one or more of the second set of segments;

apply the modified intermediate skeleton to a target avatar skeleton in a third pose to cause the target avatar skeleton to transition from the third pose to the first pose, wherein the third pose is different than the second pose, wherein the target avatar skeleton is associated with a target avatar; and place the target avatar in the third pose using the target avatar skeleton.

11. The non-transitory computer readable storage medium of claim 10, wherein the computer readable code to identify the first set of segments comprises computer readable code to:

identify a complete set of segments for the source avatar; and select a subset of the complete set of segments corresponding to the second set of segments associated with the intermediate skeleton.

12. The non-transitory computer readable storage medium of claim 10, wherein the computer readable code to determine positional information comprises computer readable code to, for each segment of the first set of segments:

determine a global position start point; and determine a global position end point.

13. The non-transitory computer readable storage medium of claim 12, further comprising computer readable code to:

determine rotational information from the global position start point and the global position end point.

14. The non-transitory computer readable storage medium of claim 13, wherein the computer readable code to modify the intermediate skeleton based on the positional information comprises computer readable code to apply the rotation information for a particular segment to a corresponding segment in the intermediate skeleton.

15. The non-transitory computer readable storage medium of claim 14, wherein the computer readable code to modify the intermediate skeleton based on the positional information comprises computer readable code to:

iteratively apply the rotation information for every segment in the first set of segments to the second set of segments.

16. The non-transitory computer readable storage medium of claim 10, wherein the computer readable code to apply the modified intermediate skeleton to the target avatar skeleton comprises computer readable code to apply an inverse kinematics solver to the intermediate skeleton and the target avatar skeleton to obtain a target avatar pose.

17. The non-transitory computer readable storage medium of claim 10, wherein the computer readable code to apply the modified intermediate skeleton to the target avatar skeleton causes a transfer of an animation from the source avatar to the target avatar.

18. The non-transitory computer readable storage medium of claim 10, wherein the intermediate skeleton is obtained based on the source avatar.

19. A system comprising:

one or more processors; and one or more computer readable media comprising computer readable code executable by the one or more processors to:

identify a first set of segments representing a first skeleton from a source avatar in a first pose;

obtain a second set of segments representing an intermediate skeleton in a second pose;

determine positional information for each of the first set of segments;

modify the intermediate skeleton based on the positional information of the first set of segments to generate a modified intermediate skeleton comprising modified positional information for one or more of the second set of segments;

apply the modified intermediate skeleton to a target avatar skeleton in a third pose to cause the target avatar skeleton to transition from the third pose to the first pose, wherein the third pose is different than the second pose, wherein the target avatar skeleton is associated with a target avatar; and place the target avatar in the third pose using the target avatar skeleton.

20. The system of claim 19, wherein the computer readable code to identify the first set of segments comprises computer readable code to:

identify a complete set of segments for the source avatar; and select a subset of the complete set of segments corresponding to the second set of segments associated with the intermediate skeleton.

* * * * *